(12) United States Patent
Doht et al.

(10) Patent No.: US 6,498,464 B1
(45) Date of Patent: Dec. 24, 2002

(54) SYSTEM FOR SUPPLYING POWER TO A LOAD CONNECTED TO A DISTRIBUTION NETWORK

(75) Inventors: Hans-Christian Doht, Erlangen (DE); Martin Hilscher, Erlangen (DE); Michael Wokusch, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,315
(22) PCT Filed: Sep. 17, 1999
(86) PCT No.: PCT/DE99/02948
§ 371 (c)(1),
(2), (4) Date: Aug. 8, 2001
(87) PCT Pub. No.: WO00/19576
PCT Pub. Date: Apr. 6, 2000

(30) Foreign Application Priority Data

Sep. 29, 1998 (DE) .......................... 198 44 750

(51) Int. Cl.[7] .............................................. G05F 1/12
(52) U.S. Cl. ..................................................... 323/247
(58) Field of Search ................................. 323/247, 259, 323/263, 355, 358, 362; 363/16, 20, 21.01, 123, 131, 140

(56) References Cited

U.S. PATENT DOCUMENTS

| | | | | |
|---|---|---|---|---|
| 4,276,587 A | * | 6/1981 | Koizumi | ....................... 363/26 |
| 4,774,649 A | * | 9/1988 | Archer | ......................... 363/20 |
| 5,122,725 A | * | 6/1992 | Kitamura et al. | ........... 323/247 |
| 5,329,222 A | | 7/1994 | Gyugyi et al. | |
| 5,514,915 A | | 5/1996 | Kim et al. | |
| 5,698,969 A | | 12/1997 | Gyugyi et al. | |

OTHER PUBLICATIONS

Abstracts of Japan: E–747, Apr. 21, 1989 vol. 13/No. 168, JP 64–1434.

Design of Power Supply Systems with Duplex Reactors, Apr. 16, 1997 Bremerhave, Verfasser: Planitz W und Schild W.

Moderne Bordnetzkonzepte, Handbuch der Werften, Band XXI, S. 66–67, 1992, Schiffahrtverlag Hansa.

* cited by examiner

Primary Examiner—Matthew Nguyen
(74) Attorney, Agent, or Firm—Morrison & Foerster, LLP

(57) ABSTRACT

A system for supplying power to a load connected to a power supply network, to achieve improve operating. the invention provides for the load to be connected via an inductive element, such as a duplex inductor, to the electrical supply network and to an energy store. With the inductive element having the same turns ratios, the impedance between the electrical power supply network and the energy store is greater by a factor of about 4 than that between the load and the power supply network or the energy store.

7 Claims, 1 Drawing Sheet

SYSTEM FOR SUPPLYING POWER TO A LOAD CONNECTED TO A DISTRIBUTION NETWORK

This application claims priority to International Application No. PCT/DE99/02948 which was published in the German language on Sep. 17, 1999.

TECHNICAL FIELD OF THE INVENTION

The invention relates to a system for supplying power, and in particular, to a system for supplying power to a load connected to a power supply network.

BACKGROUND OF THE INVENTION

U.S. Pat. No. 5,329,222 describes a power supply to a load connected to an electrical power supply network, for an additional voltage to be supplied in series between the power supply network and the load when the voltage of the power supply network falls or fails. The additional voltage is in this case is supplied in series via a series transformer, also referred to as series-path transformer. In this case, the transformer is supplied with power from an energy store.

A similar arrangement, in which the assisting energy is supplied in parallel, is known from U.S. Pat. No. 5,514,915. This arrangement is also referred to as "being shunt connected". A problem with this arrangement is that, in the event of a fault in the power supply network, energy or volt-amperes may flow into the power supply network fault rather than into the load.

A system in which the present electrical voltage drops on a power supply line are compensated for by emission of a voltage is known from Japanese Patent Abstracts: E-747, 1989; Vol. 13/No. 168, JP 64-1434. The systems comprises a converter which is connected in series via a transformer to a power supply line which connects an energy source to a load. The transformer has two windings, one of which windings is connected in series in the line. If the voltage on the power supply line falls, the converter is started, with electrical power being drawn from a DC voltage source, which is not shown in any more detail, and being emitted via the transformer as the voltage to the power supply line.

DETAILED DESCRIPTION OF THE INVENTION

A system for assisting the supply of power to a load connected to a power supply network which, while being coupled in parallel to the load, is largely decoupled from the power supply network.

The invention provides for the energy store to be connected in series with the second winding to the load-side end of the first winding, with the two windings having magnetic fields which counteract one another with the same current flow direction with respect to the load. This results in decoupling in the same manner as that of a duplex inductor.

This results in the impedance between the arrangement and power supply network being considerably greater than the impedance between the apparatus and the load, thus effectively resulting in the arrangement and the power supply network being decoupled. In the process, mutual interactions are kept low, and the supply voltage can be kept stable for the load.

Duplex inductors are known from the prior art. In the prior art, they are also referred to as current dividers, current divider induction coils, equalization or compensation inductors or smoothing inductors with a center tap. The use of duplex inductors for on-board power systems on ships is known from the literature reference "Netzgestaltung mit Duplex-Drosseln", STG Symposium at FA Elektrotechnik, on Apr. 16, 1997, Bremerhaven, authors W Planiz and W Schild.

A use of duplex inductors in which power is distributed from one or more feeders to two network elements is known from the literature reference "Moderne Bordnetzkonzepte", Shipyard Manual, Vol. XXI, pages 66-67, 1992, Schiffahrtsverlag Hansa. The duplex inductors are designed such that, during normal operation, the two branches of the inductors have currents of such magnitude flowing through them that magnetic effects of the currents are cancelled out.

SUMMARY OF THE INVENTION

In one embodiment of the invention, there is a system for supplying power to a load connected to an electrical power supply network. The system includes, for example, an energy store which can be connected via an inductive element having at least two windings to the load, and a first winding connecting the load in series with the power supply network, wherein the energy store is connected in series with a second winding to the load-side end of the first winding, with the two windings having magnetic fields which counteract one another with the same current flow direction with respect to the load.

In one aspect of the invention, the two windings are coupled to one another by means of an iron core.

In another aspect of the invention, the two windings are designed to be approximately the same size.

In still another aspect of the invention, the two windings are connected magnetically in parallel and electrically in parallel but in opposite senses.

In yet another aspect of the invention, the energy store comprises at least one energy-storage element and one coupling appliance.

In another embodiment of the invention, the energy-storage element is in the form of a superconducting energy store, capacitor, battery, flywheel or fuel cell.

In still another embodiment of the invention, the coupling appliance comprises a converter.

BRIEF DESCRIPTION OF THE DRAWINGS

An exemplary embodiment of the invention, further advantages and details will be expained in more detail in the following text with reference to the drawing, in which:

In the figures described in the following text, identical details are denoted by the same reference symbols, or at least by reference symbols having the same sense.

FIG. 1 shows an arrangement 1 for supplying power to a load 5 connected to an electrical power supply network 3. The load 5 may be, for example, a medium or high-voltage load, for example an industrial load or a factory. The load 5 in this case involves stringent requirements for reliable, uniform power supply to its connection point 4 from the electrical power supply network 3. This is particularly important for production processes, in which there must be no interruption in or disturbance of the power supply. The production of semiconductor components may be quoted as one example in this context.

Figure 1:
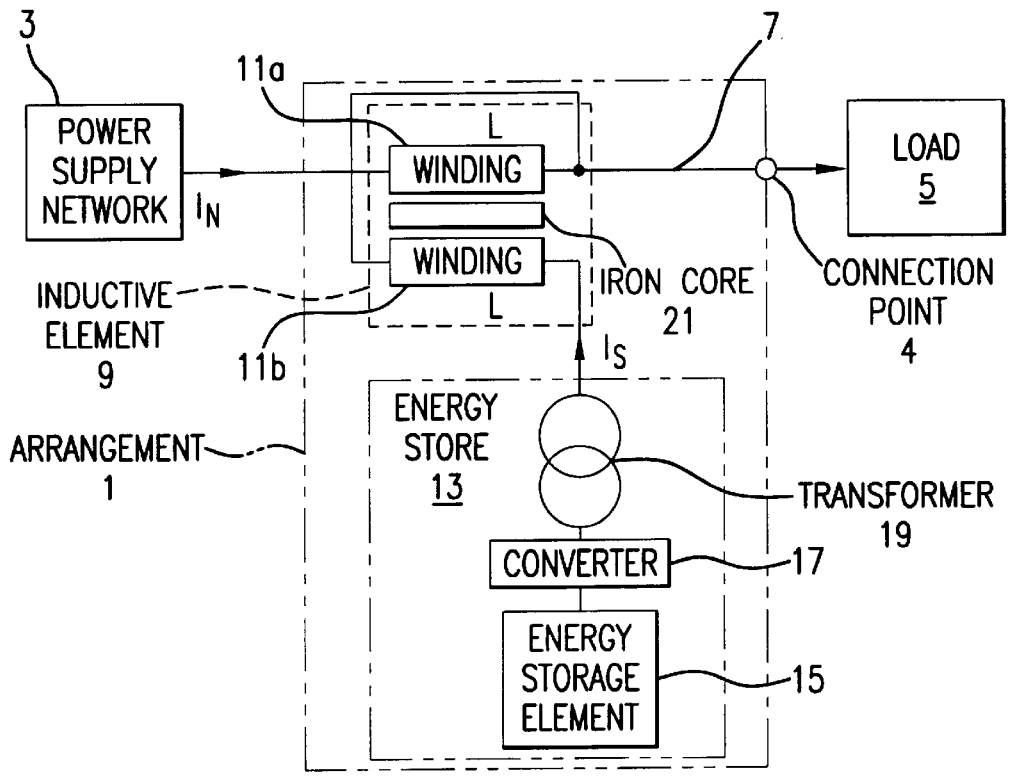
FIG. 1 shows a system according to the invention.

The load 5 may in this case be a single-phase or polyphase load, in particular for connection to a three-phase power supply network. The power supply network 3 is then designed accordingly.

In the present example, an inductive element 9 which is part of the arrangement 1 is connected in the line 7 which connects the load 5 to the power supply network 3. The inductive element 9 is preferably in the form of a duplex inductor. This has a first and a second winding, 11a and 11b, respectively. The two windings 11a and 11b each have a first and a second end, with the first ends in this case each being denoted by a dot.

The first winding 11a is connected in series in the line 7 between the power supply network 3 and the load 5. The second winding 11b connects the load 5 to an energy store 13, which is used to assist or maintain the power supply to the load 5 in the event of a fault or defect. The energy store 13 may also be regarded as a source of volt-amperes or as a voltage support, and comprises at least one energy-storage element 15 which may be, for example, in the form of a battery, flywheel, fuel cell, capacitor, diesel generator or superconducting, in particular magnetic, energy store, that is to say in the form of a mechanical, electrical or chemical energy store.

For matching to the voltage and current conditions and for controlling the energy flows, the energy store 13 may optionally comprise a coupling appliance, in particular a converter 17 and/or a transformer 19. The use and design of these components are generally known from the prior art and will not be described any further here. In the simplest case, the coupling appliance may be in the form of a switch, but the use of embodiments with converters or controllers is preferable. The energy store 13 may thus be in the form of a source of power or volt-amperes.

The two windings 11a and 11b are in this case, by way of example, magnetically closely coupled to one another via an iron core 21, and are arranged mechanically parallel to one another.

An embodiment without an iron core is also, of course, possible. Electrically, the two windings 11a and 11b are connected in parallel but in opposite senses. This can be seen from the current flow directions $I_N$ and $I_S$ shown in the figure. While the current flow direction $I_N$ in the first winding 11a runs from the power supply network 3 and from the second end to the first end (the first ends of the windings are each denoted by a dot), the current flow direction $I_S$ for the second winding 11b runs in the direction from the first end to the second end- The second end of the second winding 11b is thus electrically connected to the first end of the first winding 11a. The fields produced by the currents $I_N$ and $I_S$ in these two windings 11a and 11b thus counteract one another.

Figure 2:
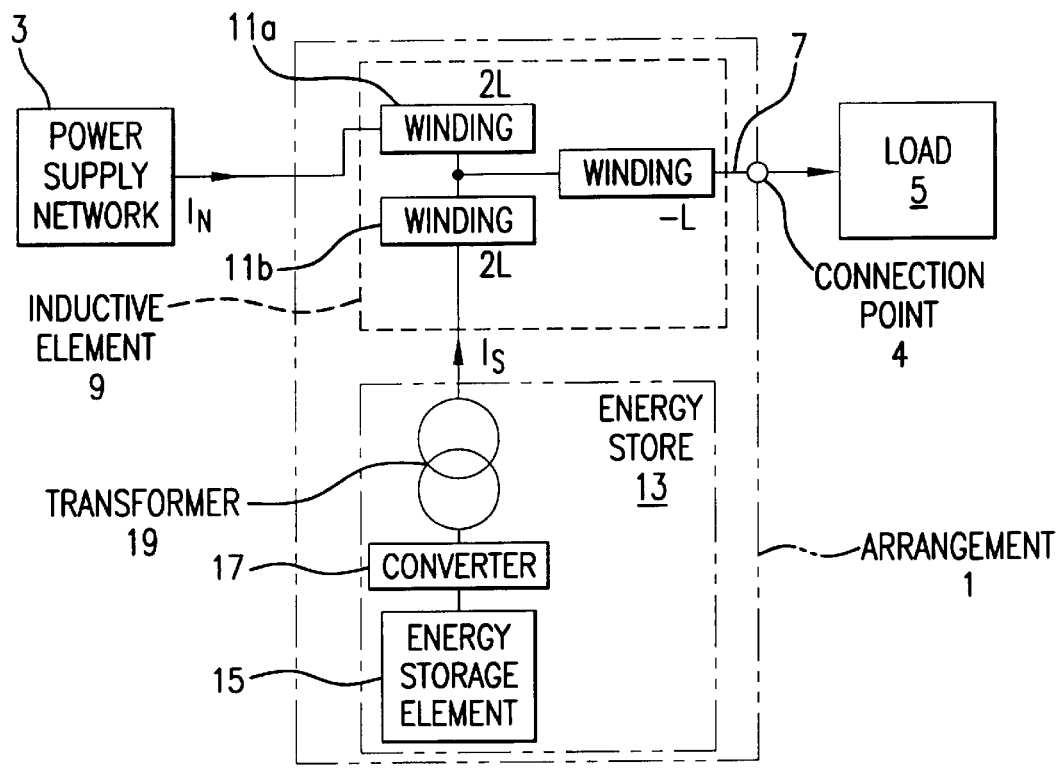
FIG. 2 shows an exemplary system in the form of an equivalence circuit.

FIG. 2 shows an illustration of the arrangement according to FIG. 1 in the form of an equivalent circuit, indicating the impedance ratios. The configuration of the inductive element 9 results in an impedance of 2L+2L=4L between the power supply network and the energy store 13 with the two windings 11a and 11b having the same turns ratios. This in each case results in an impedance of 2L−L=L between the power supply network 3 or the energy store 13 and the load 5. The impedance between the power supply network 3 and the energy store 13, which may be used as a source of volt-amperes, is thus greater by a factor of 4 than that between each of these two elements and the load 5. This results in a high level of decoupling between the power supply network 3 and the energy store 13. Mutual interactions are thus kept low.

A duplex inductor is a special transformer with two windings, preferably with little stray inductance. The currents $I_N$ and $I_S$ flow through the windings 11a and 11b in parallel but in opposite senses. In the present case, the duplex inductor must be designed for a current flow on one side, that is to say in which the full load current flows essentially via one winding. The impedance of the inductive element 9 acting between the energy store 13 and the load 5 must be taken into account in the design of the transformer 19. The same also applies when, as may be the case, the load 5 and/or the entire arrangement 1 are/is connected to the power supply network 3 via a transformer.

The voltage across the load 5 can be assisted considerably better by means of the present arrangement 1 in the event of low-impedance voltage drops. The generally known advantages of duplex inductors can be exploited advantageously in this case for both feeders or power supply network elements, namely the power supply network 3 and the energy store 13. The essential feature in this case is that the short-circuit current in the respective power supply network elements is reduced considerably. Furthermore, the voltage is supported in the event of dynamic processes in the power supply network element that is not involved. This also prevents power supply network reactions from one network element to the other.

The fundamental essence of the present idea is that an inductive element which acts like a duplex inductor is used in conjunction with an arrangement for voltage support or as a source of volt-amperes for a sensitive load. Possible applications are, for example, static compensators for voltage support or for power-factor correction, although the compensator may be of any desired type. In a case such as this, the energy store 13 in the example described above may, in a specific case, also comprise only a converter with a capacitor as the energy-storage element 15, in the form of a volt-ampere source. In this case, self-commutating voltage or current converters (for example with GTOs, GCTs or IGBTs or other suitable active devices), mains-commutated switches or controllers, mechanically switched capacitances or other suitable arrangements may be used. The use of the inductive element results in advantageous decoupling, thus creating a preferred direction for the volt-amperes in the direction of the load.

Further application options are, for example, power supplies similar to interruptible power supplies, such as those which are feasible for large amounts of energy using SMES (superconducting magnetic energy stores), flywheels or fuel cells. Energy levels of 10 up to about 1000 MVA are feasible for applications with an SMES. In principle, applications without any power being emitted and/or with high levels of power being emitted are possible.

As in the prior art, a switching element, for example a semiconductor, can also, of course, be inserted between the inductive element 9 and the electrical power supply network 3, in order to allow the load 5 to be completely decoupled from the electrical power supply network 3. This means that the load 5 must be supplied at least with power.

What is claimed is:

1. A system for supplying power to a load connected to an electrical power supply network, comprising:
   an energy store which is electrically connected via an inductive element having at least two windings to the load, and which maintains power supply to the load; and
   a first winding connecting the load in series with the power supply network, wherein the energy store is connected in series with a second winding to the load-side end of the first winding, with the two windings having magnetic fields which counteract one another with the same current flow direction with respect to the load.

2. The system as claimed in claim 1, wherein the two windings are coupled to one another by means of an iron core.

3. The system as claimed in claim 1 wherein the two windings are designed to be approximately the same size.

4. The system as claimed in claim 1, wherein the two windings are connected magnetically in parallel and electrically in parallel but in opposite senses.

5. The system as claimed in claim 1, wherein the energy store comprises at least one energy-storage element and one coupling appliance.

6. The system as claimed in claim 5, wherein the energy-storage element is in the form of a superconducting energy store, capacitor, battery, flywheel or fuel cell.

7. The system as claimed in claim 5 wherein the coupling appliance comprises a converter.

\* \* \* \* \*